(12) United States Patent
Circenis et al.

(10) Patent No.: US 7,228,545 B2
(45) Date of Patent: Jun. 5, 2007

(54) METHODS AND APPARATUS FOR MANAGING THE EXECUTION OF A TASK AMONG A PLURALITY OF AUTONOMOUS PROCESSES

(75) Inventors: Edgar I. Circenis, Loveland, CO (US); Bradley A. Klein, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 659 days.

(21) Appl. No.: 10/351,071

(22) Filed: Jan. 23, 2003

(65) Prior Publication Data

US 2004/0148607 A1 Jul. 29, 2004

(51) Int. Cl.
*G06F 9/46* (2006.01)
*G06F 17/30* (2006.01)
*G06F 11/00* (2006.01)

(52) U.S. Cl. ............... 718/102; 718/104; 718/106; 718/107; 718/108; 707/8; 707/9; 707/201; 714/2; 714/11; 714/12

(58) Field of Classification Search ............... 710/200; 712/28; 714/2, 11, 12; 718/100–108; 707/8, 707/9, 201
See application file for complete search history.

(56) References Cited

U.S. PATENT DOCUMENTS

| 5,544,353 | A  | * | 8/1996 | Forman et al. ............... 707/8 |
| 5,983,371 | A  | * | 11/1999 | Lord et al. .................... 714/55 |
| 6,910,082 | B1 | * | 6/2005 | Marcotte ..................... 709/246 |
| 2002/0032718 | A1 | * | 3/2002 | Yates et al. ................. 709/107 |
| 2002/0120819 | A1 | * | 8/2002 | Hickson ...................... 711/152 |

* cited by examiner

*Primary Examiner*—William Thomson
*Assistant Examiner*—Charles Emeka Anya (57) ABSTRACT

A method in a computer system for enabling a process to manage the execution of a periodic, single-execution (PSE) task is disclosed. The process represents one of a plurality of processes executing on the computer system, and the PSE task represents a task to be performed once by one of the plurality of processes for each rotation of a periodic schedule. Each of the plurality of processes is capable of performing the PSE task and scheduled to perform the PSE task during the each rotation of the periodic schedule. The method ensures that the PSE task is performed only once by one of a plurality of processes during each rotation of the periodic schedule.

36 Claims, 3 Drawing Sheets

METHODS AND APPARATUS FOR MANAGING THE EXECUTION OF A TASK AMONG A PLURALITY OF AUTONOMOUS PROCESSES

This patent application relates to a commonly assigned patent application entitled "Methods And Apparatus For Managing Temporary Capacity In A Computer System," by inventors Edgar I. Circenis and Bradley A. Klein application Ser. No. 10/350,660, and a commonly assigned patent application entitled "Methods And Apparatus For Rapidly Activating Inactive Components In A Computer System," by inventors Edgar I. Circenis and Bradley A. Klein application Ser. No. 10/351,128, all of which are filed on even date herewith and incorporated herein by reference.

BACKGROUND OF THE INVENTION

Modern computer systems are capable of executing multiple processes simultaneously. In a given computer system, there may exist multiple operating systems running simultaneously on different processors. These processors may be provisioned on a single node, on different nodes in a computer network or a cluster, or on different partitions of the computer system. These various processes may execute autonomously. In other words, a process may not know at any given time what actions the other processes have taken.

Some situations may require, on a periodic schedule, that a task be performed only once by one of the processes. These tasks are referred to herein as periodic, single-execution (PSE) tasks. Suppose any one of the processes is capable of the performing the PSE task, and each process competes to perform the PSE task based on the aforementioned periodic schedule. Since each autonomous process is not aware of the actions taken by other processes, there is a need in these situations to efficiently manage the execution of the PSE task so that the PSE task is not needlessly and/or erroneously performed more than once during each rotation of the periodic schedule.

One way to coordinate the various processes is to designate one of the processes as the designated master process ("DMP"). During each turn of the periodic schedule, the DMP would perform the required PSE task(s). If the DMP terminates or crashes, another process would be designated the new DMP to handle the PSE task(s) going forward.

There are however drawbacks with this approach. As an example, when the DMP crashes, there is no way for another process to step in and perform the required PSE task(s) unless one of the remaining processes is first designated the new DMP. In some cases, the delay involved in detecting the DMP failure and in designating a new DMP may cause the PSE task(s) to be skipped in one or more rotations of the periodic schedule. Also, the process of designating a process a DMP and re-designating a new DMP when the previous DMP crashes involves a non-trivial amount of overhead.

In view of the foregoing, there are desired improved methods and apparatus for managing the execution of a PSE task among multiple autonomously executing processes, each of which is scheduled to attempt to perform the PSE task based on a periodic schedule.

SUMMARY OF THE INVENTION

The invention relates, in one embodiment to a method in a computer system for enabling a process to manage the execution of a periodic, single-execution (PSE) task, the process representing one of a plurality of processes executing on the computer system, the PSE task representing a task to be performed once by one of the plurality of processes for each rotation of a periodic schedule, each of the plurality of processes being capable of performing the PSE task and scheduled to perform the PSE task during the each rotation of the periodic schedule. The method includes obtaining an exclusive lock on a first storage location, the first storage location being globally accessible to the plurality of processes, the first storage location storing a global synchronization value, the exclusive lock preventing other processes from writing to the first storage location if the exclusive lock is obtained by the process. The method further includes comparing a local synchronization value associated with the process with the global synchronization value. The method includes incrementing both the local synchronization value and the global synchronization value prior to releasing the exclusive lock and performing one of releasing the exclusive lock and performing the PSE task and then performing the other one of the releasing the exclusive lock and performing the PSE task if the local synchronization value equals the global synchronization value. The method additionally includes setting the local synchronization value to be equal to the global synchronization value and releasing the exclusive lock if the local synchronization value differs from the global synchronization value.

In another embodiment, the invention relates to a method in a computer system for enabling a plurality of processes to manage the execution of a periodic, single-execution (PSE) task, the PSE task representing a task to be performed once by one of the plurality of processes during each rotation of a periodic schedule, each of the plurality of processes being capable of performing the PSE task and scheduled to perform the PSE task during the each rotation of the periodic schedule. The method includes providing a set of codes to the each of the plurality of processes, the set of codes being configured to execute on behalf of a given process of the plurality of processes at a periodically scheduled time in conformance with the periodic schedule. The set of codes includes codes for allowing the given process to obtain an exclusive lock on a first storage location, the first storage location being globally accessible to the plurality of processes, the first storage location storing a global synchronization value, the exclusive lock allowing the given process to update the global synchronization value and preventing other processes from updating the global synchronization value if the exclusive lock is obtained by the given process. The set of codes also includes codes for comparing the global synchronization value with a local synchronization value associated with the given process. The set of codes additionally includes codes for performing steps (a)–(c) if the local synchronization value associated with the given process is equal to the global synchronization value, step (a) including incrementing both the local synchronization value associated with the given process and the global synchronization value prior to releasing the exclusive lock, step (b) including performing one of releasing the exclusive lock and performing the PSE task, and step (c) including performing the other one of the releasing the exclusive lock and the performing the PSE task. The set of code further includes codes for setting the local synchronization value associated with the given process to be equal to the global synchronization value and releasing the exclusive lock if the local synchronization value associated with the given process differs from the global synchronization value.

In yet another embodiment, the invention relates to an article of manufacture comprising a program storage medium having computer readable codes embodied therein, the computer readable codes being configured for enabling a process to manage the execution of a periodic, single-execution (PSE) task, the process representing one of a plurality of processes executing on the computer system, the PSE task representing a task to be performed once by one of the plurality of processes for each rotation of a periodic schedule, each of the plurality of processes being capable of performing the PSE task and scheduled to perform the PSE task during the each rotation of the periodic schedule. The article of manufacture includes computer readable codes for obtaining an exclusive lock on a first storage location, the first storage location being globally accessible to the plurality of processes, the first storage location storing a global synchronization value, the exclusive lock preventing other processes from writing to the first storage location if the exclusive lock is obtained by the process. The article of manufacture further includes computer readable codes for comparing a local synchronization value associated with the process with the global synchronization value. The article of manufacture additionally includes computer readable codes for incrementing, if the local synchronization value equals the global synchronization value, both the local synchronization value and the global synchronization value prior to releasing the exclusive lock and performing one of releasing the exclusive lock and performing the PSE task and then performing the other one of the releasing the exclusive lock and performing the PSE task. Furthermore, the article of manufacture includes computer readable codes for setting the local synchronization value to be equal to the global synchronization value and releasing the exclusive lock if the local synchronization value differs from the global synchronization value.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided a technique and apparatus for managing the execution of a periodic, single-execution (PSE) task by a plurality of autonomous processes in a computer system. As the term is employed herein, a periodic, single-execution (PSE) task represents a task that must be performed only once for each rotation of a periodic schedule by one of the autonomous processes, i.e., processes that execute independently and generally are not aware of actions taken by the other autonomous processes and may not be aware of the other autonomous processes at all. A computer system may represent a stand-alone computer, such as a mainframe system, a server or a workstation. The computer system may also represent a networked computer comprising a plurality of CPUs, memory modules, I/O devices coupled in a network. The computer system may be unpartitioned or it may be partitioned into multiple partitions.

In accordance with a preferred embodiment of the present invention, there is provided a global synchronization value that is stored in a storage location accessible to all processes. The storage location may be in nonvolatile memory or in a file on a disk, for example. Each process also tracks its own local synchronization value. Upon process startup, the local synchronization value associated with the process is initialized.

When the scheduled time arrives for a process to perform the PSE task, that process first ascertains whether the PSE task has already been performed during that rotation of the periodic schedule by obtaining an exclusive lock on the global synchronization value storage location and comparing the global synchronization value against its own local synchronization value.

If the global synchronization value is the same as its own local synchronization value, that process is the winner in that rotation of the periodic schedule. In such case, the winning process would increment the global synchronization value (e.g., by adding 1 to the global synchronization value) to indicate that the PSE task has already been performed in the current rotation of the periodic schedule. The winning process also updates its own local synchronization value by incrementing its own local synchronization value.

The winning process then performs the PSE task and releases the exclusive lock. In some cases, the exclusive lock may be released first to allow other processes to check the global synchronization value while the winning process performs the PSE task.

Other processes may then obtain the exclusive lock to the global synchronization value when the scheduled time arrives for them to perform the PSE task. When the scheduled time arrives for a given process to perform the PSE task, that given process may obtain the exclusive lock and compare its own local synchronization value against the global synchronization value. Since the global synchronization value has already been incremented by the winning process earlier, the two values will be different. In this case, that given process would update its local synchronization value to be equal to the global synchronization value and releases the exclusive lock. The process continues until all processes have a chance to update their local synchronization values.

If one of the processes fails to obtain the exclusive lock, that process may attempt at a later time during the same rotation of the periodic schedule to obtain the exclusive lock. For example, a process may wait for a random time unit to pass before trying to obtain the exclusive lock.

In the next rotation of the periodic schedule, the procedure repeats. If the previous winning process wins again, the exact same procedure occurs. However, if the previous winning process terminates or crashes before the next rotation of the periodic schedule, the global synchronization value in this next rotation would therefore not be incremented by the previous winning process. Instead, the first process that obtains the exclusive lock in this next rotation would see that its own local synchronization value is equal to the global synchronization value. Consequently, this first process that obtains the exclusive lock in this rotation would know that it is the winner. Thus, this new winning process would increment both the global synchronization value and its own local synchronization value, perform the PSE task, and release the exclusive lock. In this manner, the new winning process is self-designated, and the remaining processes would only access the global synchronization value to set their own local synchronization values to be equal to the global synchronization value.

The procedure discussed above continues for each rotation of the periodic schedule, with the first process that obtains the exclusive lock in a given rotation designating itself the winning process if its local synchronization value equals the global synchronization value. If the previous winning process, i.e., the process that wins in the previous rotation, crashes, another winning process would automatically be self-designated.

As can be appreciated from the foregoing, the invention advantageously allows the winning process to be self-selected even if each process is unaware of the actions taken by any other processes, i.e., not informed whether another process has performed the PSE task. Any process can designate itself the winning process if it obtains the exclusive lock first in any rotation of the periodic schedule and if its local synchronization value equals the global synchronization value. When a previous winning process terminates, another process can seamlessly be designated the winning process in the next rotation. Accordingly, there is no single point of failure. Furthermore, when a new process is activated, it can in most cases participate in the competition to be the winning process within one rotation of the periodic schedule. Additionally, the invention employs a simple, low-overhead algorithm for managing the execution of the PSE task, thereby minimizing impact to overall system performance.

Advantageously, the local synchronization values also provide a heartbeat capability (i.e., furnishing a way to rapidly ascertain whether any process has terminated or crashed) if they are made visible to the other autonomous processes via storing them in a storage location accessible to all processes. If the local synchronization value of any process differs from the global synchronization value by more than a predefined value (e.g., more than 1), that process may not have updated its own local synchronization value in the last rotation and may therefore have crashed or terminated. The value of the difference between the local synchronization value of a crashed process and the global synchronization value may provide a rough estimate of when the crash occurs. For example, if the difference is 20 and the periodic schedule involves updating the local synchronization value every two minutes, the crash may have occurred roughly 40 minutes ago (20 times 2).

In the context of an ICOD system, an example of such aforementioned PSE task is the need to detect problem states in a partitionable ICOD (instant capacity on demand) system and to send out a notification to the user on a periodic basis. Another PSE task may involve periodically adjusting the global temporary capacity balance, i.e., the value of the global variable that tracks the number of temporary capacity units available on an ICOD system as a whole.

To elaborate, in an ICOD system, there may exist a number of inactive components which can be activated to increase the system's computing capability as needed. These inactive components (referred to herein as "ICOD components") represent software and/or hardware components shipped with the computer system, which components the user has not paid for, and is therefore not entitled to use as a matter of right.

In some ICOD systems, the user may be allowed to activate and use ICOD components without having to obtain prior approval from the computer system vendor. The ICOD component usage is accounted for by tracking and updating the temporary capacity balance. The user may arrange to purchase temporary capacity units beforehand to increase the temporary capacity balance, and the computer system may automatically reduce the temporary capacity balance whenever ICOD components are activated and used. For example, a user may purchase 30 CPU-hours of temporary capacity balance, thereby allowing a user to use 1 ICOD CPU for 30 hours or 6 ICOD CPUs for 5 hours. The user may also be allowed to accumulate a debit of temporary capacity units, i.e., incurring a negative temporary capacity balance, which the user may settle up later by making a payment at a later date.

Figure 1:
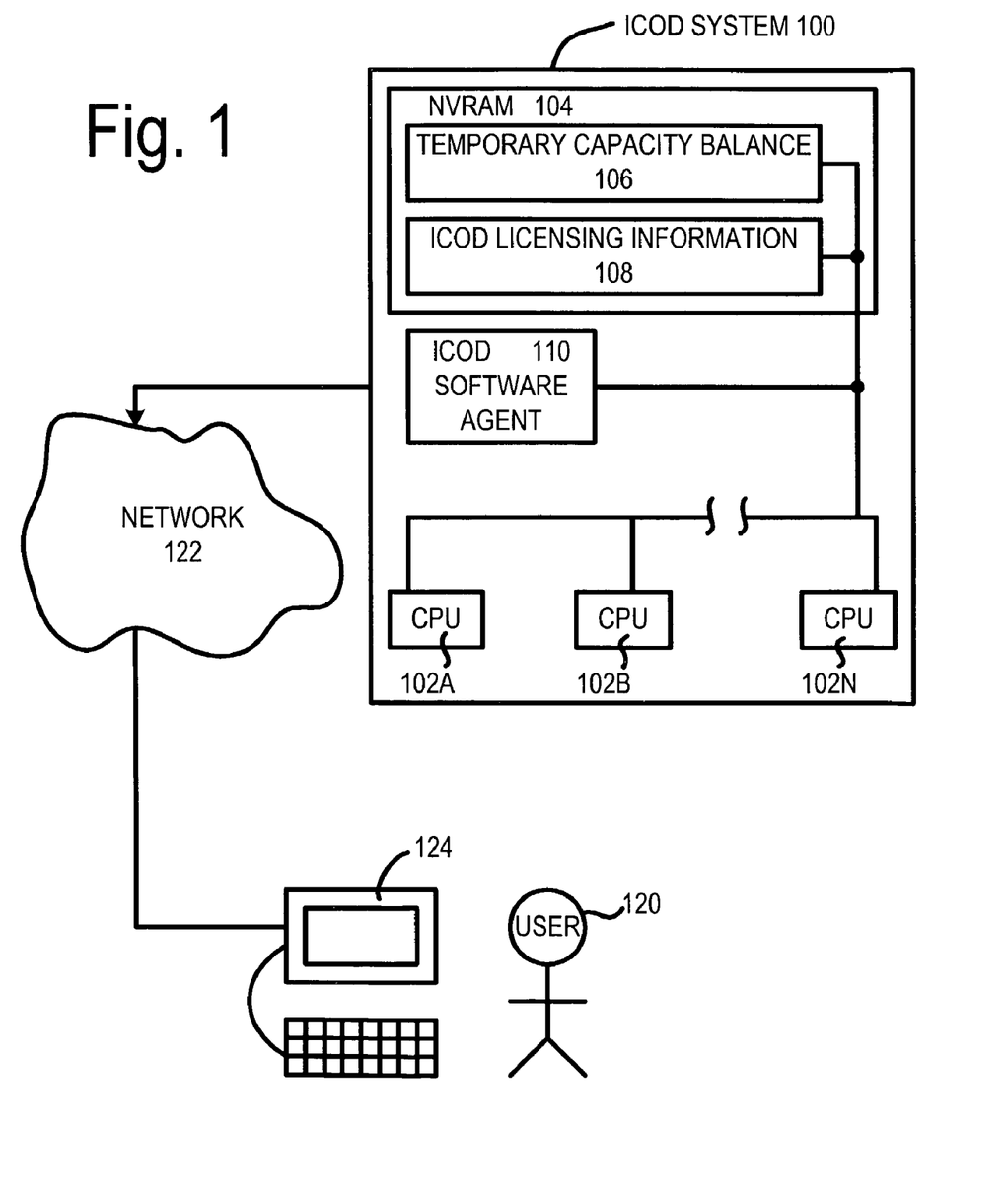
FIG. 1 shows a computer system having a plurality of CPUs, some of which may represent ICOD CPU components.

To illustrate, FIG. 1 shows an ICOD system 100 having a plurality of CPUs 102A–102N, some of which may represent ICOD CPU components. FIG. 1 also shows a nonvolatile memory NVRAM 104, representing the memory location for tracking both the temporary capacity balance 106 and ICOD licensing information 108. ICOD licensing information 108 includes information such as the number of CPUs licensed, the number of ICOD CPUs and other miscellaneous identification data regarding the ICOD system. The temporary capacity balance feature is discussed in details in the aforementioned co-pending patent application entitled "Methods And Apparatus For Managing Temporary Capacity In A Computer System".

An ICOD software agent 110 is shown coupled to the CPUs and NVRAM 104. On a periodic schedule, e.g., every 30 minutes, ICOD software agent 110 wakes up and takes inventory of the number of CPUs activated. If the number of active CPUs exceeds the number of CPUs allowable under license, ICOD software agent 110 will note that the system is out of compliance and begins to debit temporary capacity balance 106. For example, if the information in ICOD licensing information 108 indicates that only 3 CPUs should be active but ICOD software agent 110 found 7 CPUs active instead in ICOD system 100, the number of ICOD CPUs (i.e., excess CPUs) employed is 4. In this case, ICOD software agent 110 may debit 2 CPU-hours (4 ICOD CPUs times 30 minutes per rotation of the periodic schedule) from temporary capacity balance 106. The information regarding the compliance state of ICOD system 100, as well as the current temporary capacity balance may then be sent by ICOD software agent 110 to a user 120 via a network 122 and a terminal 124 in accordance with the same periodic schedule or a different periodic schedule.

In the example of FIG. 1, the computer system has only one operating system and one set of CPUs, rendering the task of tracking the temporary capacity units fairly straight forward. In this case, only one ICOD software agent is required to track the temporary capacity balance for the entire computer system.

The situation is more complicated when the computer system has multiple partitions, each of which may execute a different operating system. In this case, there may be multiple ICOD software agents on the various partitions, with each ICOD software agent executing autonomously from the others. Although each partition may have a copy of the ICOD software agent running, only one notification need be sent to the user based on the globally shared data stored in the ICOD system's memory for each rotation of the periodic schedule. Likewise, the global temporary capacity value needs to be adjusted only once based on the number of components that are active on all partitions of the ICOD system during each rotation of the periodic schedule.

Thus, although each ICOD software agent is scheduled to perform the temporary capacity balance updating task every 30 minutes, only one of the ICOD software agents needs to actually perform the update during each 30-minute rotation. If there is no management, multiple notifications may be sent and/or duplicate adjustments may be erroneously made to the global temporary capacity value by autonomously executing ICOD software agents.

In this case, the invention can be employed to efficiently track the global temporary capacity value and ensure that the task of updating the global temporary capacity value is not duplicated by the autonomously executing ICOD software agents. Even though the ICOD software agents may be executing on different operating systems, on different partitions and/or on different clusters, the synchronization technique allows one of the ICOD software agents to self-designate as the winning process and to update the global temporary capacity only once during each rotation of the periodic schedule. Additionally, the local synchronization values associated with each ICOD software agent may be employed as a heartbeat monitor in the manner discussed earlier. If a copy of ICOD software agent is tampered with or crashes, the difference between its local synchronization value and the global synchronization value will exceed the predefined threshold (e.g., 1) within a few rotations of the periodic schedule, enabling the computer system vendor to take any necessary corrective action in a timely manner.

Figure 2:
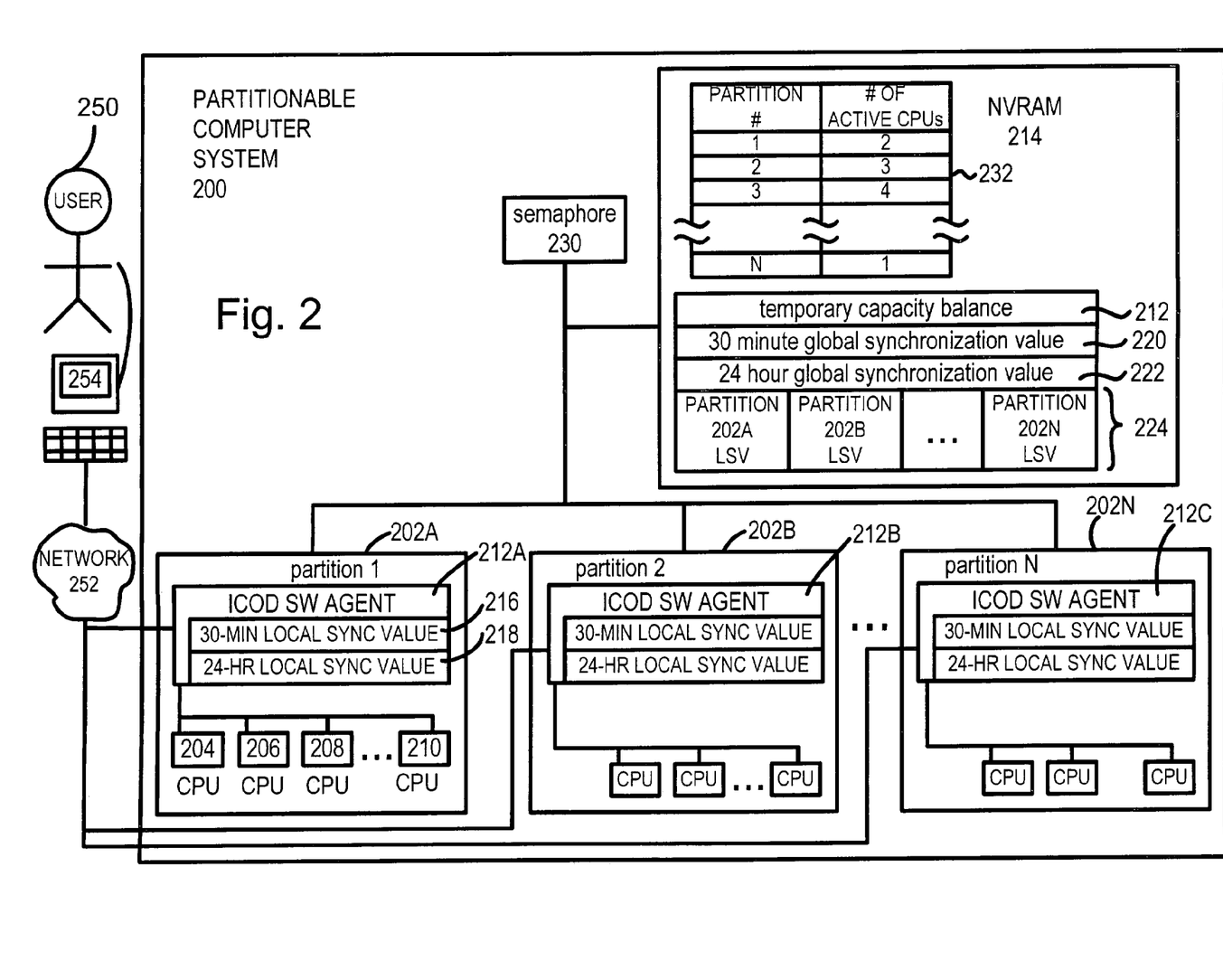
FIG. 2 shows, in accordance with one embodiment of the present invention, a partitionable computer system having multiple autonomous processes executing on multiple partitions of the computer system.

These and other features and advantages of the present invention may be better understood with reference to the drawings and discussions that follow. FIG. 2 shows, in accordance with one embodiment of the present invention, a partitionable computer system 200 having multiple partitions 202A–202N. Each of partitions 202A–202N has its own operating system and its own set of CPUs, some of which may be ICOD CPU components. Accordingly, some of the CPUs on a given partition may be active and other CPUs may be inactive according to the ICOD licensing information (not shown). For example, CPUs 204 and 206 in partition 202A may be active while CPUs 208 and 210 may be inactive ICOD CPUs.

Each partition also includes an ICOD software agent, which is responsible for, among other things, providing a notification to a user 250 (via a network 252 and a terminal 254, for example) regarding the compliance status of partitionable computer system 200 on a periodic basis. The ICOD software agent on each partition is also responsible for updating the global temporary capacity balance 212 based on the number of CPUs active in partitionable computer system 200. Global temporary capacity balance 212 is shown stored in nonvolatile NVRAM 214.

Although each partition has its own ICOD software agent and each of the ICOD software agent executes autonomously, only one of the ICOD software agents needs to notify the user of the compliance status during each rotation of the periodic notification schedule. Likewise, only one of the ICOD software agents needs to update global temporary capacity balance 212 during each rotation of the periodic update schedule.

In the example of FIG. 2, the global temporary capacity balance needs to be updated each 30 minutes, and a notification needs to be sent to user 250 every 24 hours. Each ICOD software agent on each partition is provided with two local synchronization values: a 30-minute local synchronization value and a 24-hour local synchronization value. With reference to partition 202A, for example, the 30-minute local synchronization value is shown by reference 216 and the 24-hour local synchronization value is shown by reference number 218.

Globally, there exist two global synchronization values: a 30-minute global synchronization value (220) and a 24-hour global synchronization value (222), both of which are kept in NVRAM 214 as shown. NVRAM 214 is globally accessible to all ICOD software agents.

Upon process startup, the 30-minute local synchronization value associated with that process is set to a value that is different from the 30-minute global synchronization value. On the other hand, the 24-hour local synchronization value associated with that process is set to the 24-hour global synchronization value.

The distinction is made to illustrate that there may exist two types of PSE tasks. In this example, the 30-minute PSE task represents one type of PSE task that can be performed only by a process that has been running for at least the entire duration of the immediately preceding rotation of the periodic schedule (e.g., the 30-minute periodic schedule). For example, if the performance of the 30-minute PSE task by a process requires certain data that could be obtained only if that process has been running for at least the entire duration of the immediately preceding rotation of the 30-minute periodic schedule, initializing the 30-minute local synchronization value to a value that is different from the 30-minute global synchronization value advantageously prevents a newly activated process from becoming the winner in the rotation which that process is activated. In one embodiment, the 30-minute local synchronization value of the newly activated process may be initialized to a value that is equal to the value of the 30-minute global synchronization value minus 1, for example.

Consider the following example. If a new process is activated after system booting, its own 30-minute local synchronization value would be set to a value that is different from the 30-minute global synchronization value. If that new process is not the first process that obtains the exclusive lock in the rotation during which it becomes activated, the 30-minute local synchronization value of that process would catch up to the 30-minute local synchronization values of other processes after one rotation of the 30-minute periodic schedule If a newly activated process happens to be the first process that obtains the exclusive lock in the rotation during which it becomes activated, that newly activated process is advantageously prevented from becoming the winner since its own 30-minute local synchronization value differs from the 30-minute global synchronization value. This is because the newly activated process did not have the opportunity to set its 30-minute local synchronization value to be equal to the 30-minute global synchronization value in the last rotation. In fact, its own 30-minute local synchronization value has been deliberately set to a value that is different from the 30-minute global synchronization value upon process startup, as mentioned earlier.

In this case, the newly activated process would set its 30-minute local synchronization value to be equal to the 30-minute global synchronization value in this rotation and releases the lock. Note that the 30-minute global synchronization value would be subsequently incremented by the winning process in that rotation and would therefore be different than the 30-minute local synchronization value of the newly activated process, which did not win in that rotation.

In the next rotation, that new process may again be the first process to obtain the exclusive lock due to the periodic nature of its internal periodic schedule. However, since the 30-minute global synchronization value was incremented in the last rotation after the new process sets its own 30-minute local synchronization value to be equal to the 30-minute global synchronization value, the new process would not be the winner again. Again, it will set its own 30-minute local synchronization value to the 30-minute global synchronization value, and again, the 30-minute global synchronization value will subsequently be incremented by the process that actually wins in that rotation.

Although this is one rare case where the 30-minute local synchronization value of the new process lags behind the 30-minute local synchronization values of other processes at the end of each 30-minute rotation, there is no harm since there are other processes available to step in and take over as the winning process if necessary. If all the other processes are terminated or crash, the new process would catch up after one 30-minute rotation and be self-designated as the winning process to perform the PSE task. In any event, the newly activated process is advantageously prevented from becoming the winner in the rotation that it becomes active because of the initialization technique discussed above. In fact, the initialization technique ensures that the newly activated process stays active for at least one rotation before that new process can win in a subsequent rotation.

On the other hand, the 24-hour PSE task represents another type of PSE task that can be performed by any of the autonomous processes, irrespective of when the process that performs the PSE task is activated. Initializing the 24-hour local synchronization value of a process to the 24-hour global synchronization value allows a newly activated process to compete on an equal basis with other existing processes for the privilege of performing the 24-hour PSE task.

With reference again to FIG. 2, NVRAM 214 also stores an array 224 of 24-hour local synchronization values (LSVs), reflecting the 24-hour local synchronization values in the partitions. Array 224 provides a heartbeat monitoring capability to allow an ICOD software agent to ascertain whether the ICOD software agent associated with any given partition executes properly. In the example herein, the 24-hour global synchronization value is used to indicate the heartbeat for a process in array 224. Thus, the heartbeat value associated with that process is updated with the value of the 24-hour global synchronization value into array 224. This update is performed by a process irrespective whether that process is the winner in a rotation. On the other hand, if the 30-minute global synchronization value is used to indicate the heartbeat in array 224 (e.g., if higher granularity data regarding the heartbeats of the processes is desired), the heartbeat value associated with that process may be set to the 30-minute global synchronization value in array 224 if desired.

Since each ICOD software agent is scheduled to update the global temporary capacity balance every 30 minutes, it is necessary to ensure that only one of the ICOD software agents performs the updating task during each rotation of the 30-minute update schedule. During each rotation, each autonomous ICOD software agent wakes up according to its own 30-minute schedule and attempts to obtain a lock on semaphore 230, which controls access to NVRAM 214. Each ICOD software agent that obtains a lock on semaphore 230 would check its own 30-minute local synchronization value against the 30-minute global synchronization value in NVRAM 214. If the two values are equal, that ICOD software agent is self-designated as the winner.

In this case, the winning ICOD software agent would increment its own local synchronization value and the global synchronization value. The winning ICOD software agent also updates the heartbeat value associated with its partition in array 224. In one embodiment, the heartbeat value reflects the 24-hour local synchronization value, and the winning ICOD software agent simply has to copy its 24-hour local synchronization value into the heartbeat value associated with its partition in array 224.

Whenever an ICOD software agent obtains a lock on semaphore 230 and accesses NVRAM 214, that ICOD software agent would record in array 232 the number of CPUs active in its own partition irrespective of whether that ICOD software agent wins in that rotation. Array 232 is employed to keep track of the number of active CPUs in each partition. Thus the winning ICOD software agent also records the number of active CPUs in its own partition with an array 232.

The winning ICOD software agent then performs the task of updating the global capacity balance 212. In one embodiment, the winning ICOD software agent may release the lock on semaphore 230 prior to commencing the global temporary capacity balance updating task in order to give other ICOD software agents the opportunity to access NVRAM 214 while the updating task is underway. This approach advantageously maximizes the time available for each of the other ICOD software agents to attempt to obtain a lock on semaphore 230 at least once during the 30-minute rotation since the updating task may take some finite amount of time and there is no need to hold up the other ICOD software agents while the updating task is underway.

To update the global capacity balance, the winning ICOD software agent may make a system call to determine the number of CPUs currently present in partitionable computer system 200. The winning ICOD software agent may then consult array 232 to determine the number of active CPUs across all partitions. As mentioned earlier, the number of active CPUs for each partition is updated in nonvolatile memory during each rotation of the 30-minute update schedule.

To ascertain whether the active CPU value in array 232 is valid for a particular partition, the winning ICOD software first verifies if the active CPU value associated with that particular partition is current. To do so, the winning ICOD software agent ascertains whether the ICOD software agent in that particular partition has recently updated its active CPU value into array 232 by consulting heartbeat array 224. In one embodiment, the winning ICOD software obtains the local synchronization value associated with the partition in question from heartbeat array 224 and compares this local synchronization value against the global synchronization value. If the difference between the local synchronization value associated with the partition in question and the global synchronization value does not exceed a given threshold (e.g., 1), the ICOD software agent in the partition in question is still running and the number of active CPUs reported in array 232 for that partition is deemed reliable. On the other hand, if the difference between the local synchronization value associated with the partition in question and the global synchronization value exceeds the aforementioned given threshold, the number of active CPUs reported in array 232 for that partition is deemed suspect since the ICOD software agent associated with that partition may not have updated the number of active CPUs into array 232 in the last rotation of the 30-minute update schedule or recently.

If the active CPU value for a particular partition in array 232 is suspect, a number of business rules may be employed to handle the situation. One business rule may state that if a partition is known to be active (e.g., if it is possible to determine that the partition's hardware is active) but its active CPU number in array 232 is suspect, all CPUs in that partition are deemed active for the purpose of updating the global temporary capacity balance. This business rule operates on the assumption that the ICOD software agent on that partition must have been tampered or rendered ineffective to prevent that ICOD software agent from doing its job of reporting the true number of active CPUs to array 232. Another business rule may temporarily employ the latest available active CPU number for that partition in array 232 for the temporary capacity updating task until the ICOD software agent in the partition in question is repaired. Other business rules may also exist.

The winning ICOD software agent then compares the total number of active CPUs across all partitions (both valid and assumed) against the number of active CPUs allowed per the ICOD licensing information. If the total number of active CPUs across all partitions exceeds the number of allowable CPUs specified by the ICOD licensing information, the global temporary capacity balance is reduced.

For example, if there are 6 more CPUs active than allowed per the ICOD licensing information and if the unit value employed to track the global temporary capacity balance is CPU-hour, for example, the global temporary capacity balance would be reduced by 3 (6 times ½ hour).

Other ICOD software agents, upon obtaining a lock on semaphore 230, would also compare their own local synchronization value against the global synchronization value. If the local synchronization value of an ICOD software agent differs from the global synchronization value, that ICOD software agent is not the winner. In this case, that ICOD software agent simply updates its own local synchronization value to be equal to the global synchronization value. That ICOD software agent may also update the local synchronization value in heartbeat array 224 as well as update the number of active CPUs in its own partition into array 232. The procedure then repeats for every rotation of the 30-minute update schedule.

An analogous procedure occurs every 24 hours to notify the user of the compliance state of partitionable system 200. The compliance state notification may include information such as the number of active CPUs, the number of CPUs active in excess of the number of active CPUs allowed per the license, the global temporary capacity balance, and any fault condition. Since the same synchronization mechanism is employed using the 24-hour global synchronization value and the 24-hour local synchronization values at the partitions, the notification is sent only once by one of the ICOD software agents.

Figure 3:
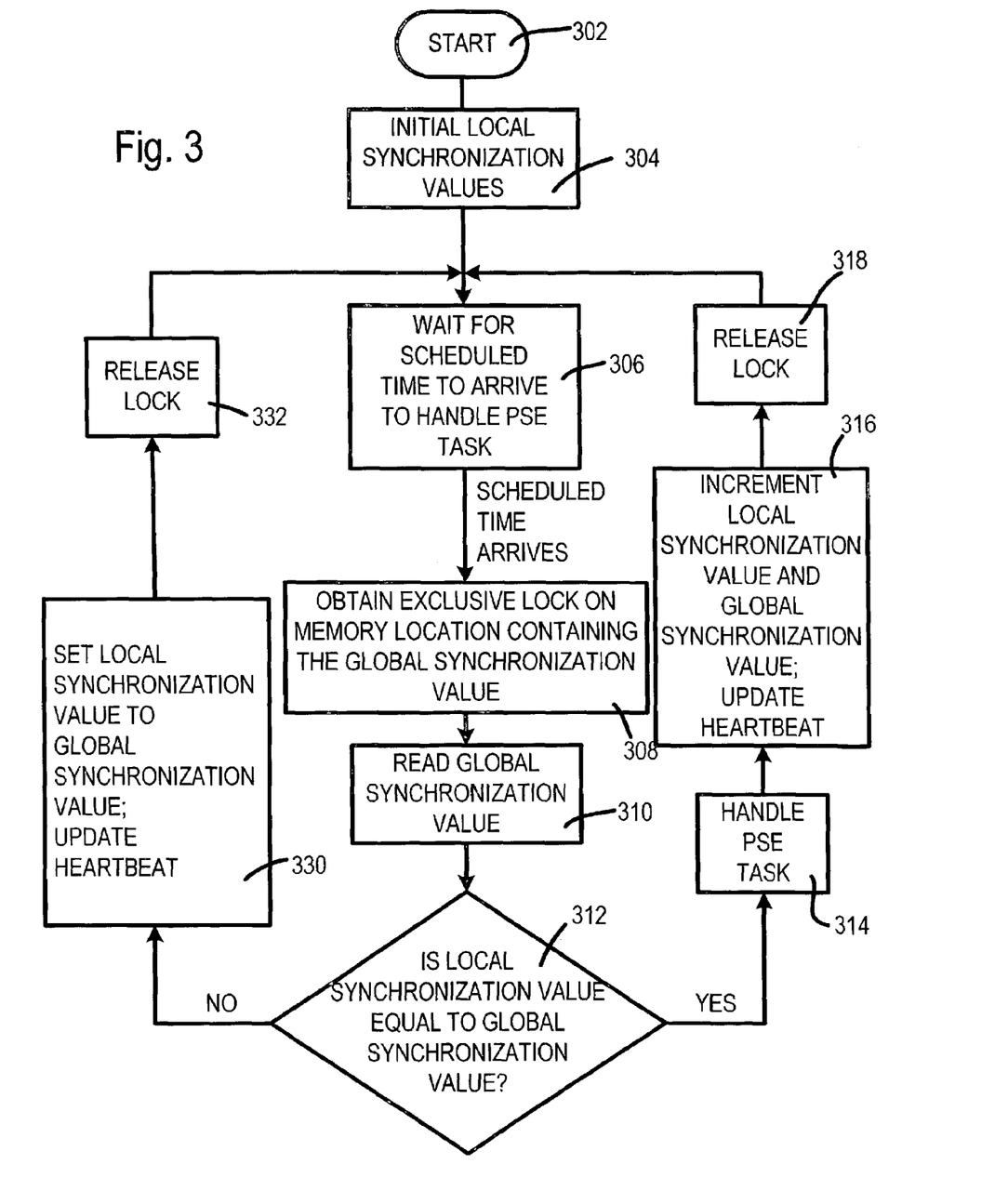
FIG. 3 shows, in accordance with one embodiment of the present invention, the steps for managing the execution of a periodic, single-execution (PSE) task by one of a plurality of autonomously executing processes.

FIG. 3 shows, in accordance with one embodiment of the present invention, the steps for managing the execution of a periodic, single-execution (PSE) task by one of a plurality of autonomously executing processes. The steps of FIG. 3 are taken by each autonomously executing process when the scheduled time arrives for that process to attempt to perform the PSE task. In step 304, all local synchronization values are initialized in the manner discussed earlier. This step 304 may take place upon process startup, for example. In step 306, the process waits until the scheduled time arrives to cause the process to try to handle the PSE task.

When the scheduled time arrives, the process obtains an exclusive lock on the memory location storing the global synchronization value in step 308. In step 310, the global synchronization value is read. In step 312, the global synchronization value is compared against the local synchronization value. If the local synchronization value equals the global synchronization value, the PSE task is handled in step 314. In step 316, both the local synchronization value and global synchronization value are incremented. Further, the heartbeat value is also updated in step 316, e.g., by updating the heartbeat value with the current 24-hour local synchronization value. In one embodiment, the local synchronization value is represented by one-byte and may roll over if it becomes too large. Likewise, the global synchronization value may also roll over if it becomes too large in one embodiment. In step 318, the exclusive lock obtained earlier in step 308 is released.

As mentioned earlier, it is possible to update the local synchronization value and global synchronization value (step 316) and then immediately release the exclusive lock (step 318) prior to commencing the performance of the PSE task (step 314). This approach is advantageous in that other subsequent processes would be precluded from being designated the winner in the current rotation (since the global synchronization value has already been incremented) yet are not held up waiting to obtain the exclusive lock while the winning process performs the PSE task. Thereafter the process returns to step 306 to wait for the arrival of the next scheduled time.

On the other hand, if the local synchronization value is different from the global synchronization value (as determined in step 312), the local synchronization value is set to be equal to the global synchronization value and the heartbeat value is updated (step 330). The exclusive lock is then released in step 332. Thereafter the process returns to step 306 to wait for the arrival of the next scheduled time.

As can be appreciated from the foregoing, the invention advantageously ensures that the PSE task is handled only once during each rotation of the periodic schedule by one of the autonomously executing processes, such as processes executing on different partitions of a computer system. This is so even if each process is unaware of the actions taken by any other processes. Additionally, the synchronization is accomplished using low-overhead operations, i.e., reading and writing to a global memory location and simple addition and compare operations.

There is no single point of failure since any process can designate itself the winning process if it obtains the exclusive lock first in any rotation of the periodic schedule and if its local synchronization value is equal to the global synchronization value. Additionally, the use of the local synchronization values as a heartbeat indicator also provides a way for a process to rapidly ascertain whether any other autonomous process has stopped executing.

While this invention has been described in terms of several preferred embodiments, there are alterations, permutations, and equivalents which fall within the scope of this invention. For example, although the example herein employs CPUs as exemplary ICOD components, an ICOD component may represent any software and/or hardware component and/or subsystem that can be activated and inactivated to modify the computing capability of a computer system. Also, although the example PSE tasks herein are tasks to calculate temporary capacity balance or send status reports, PSE tasks can be any task that should only happen once in a given rotation of a periodic schedule for a set of autonomous processes that are capable of performing the task. For example, to eliminate a single point of failure, two systems may be configured to run identical processes but only one set of results from these processes is required. In this case, the production of the results might be a PSE task. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, a method for enabling a process to manage the execution of a periodic single-execution (PSE) task, said process representing one of a plurality of processes executing on said computer system, said PSE task representing a task to be performed once by one of said plurality of processes for each rotation of a periodic schedule, each of said plurality of processes being capable of performing said PSE task and scheduled to perform said PSE task during said each rotation of said periodic schedule, comprising:

obtaining an exclusive lock on a first storage location, said first storage location being globally accessible to said plurality of processes, said first storage location storing a global synchronization value, said exclusive lock preventing other processes from writing to said first storage location if said exclusive lock is obtained by said process;

comparing a local synchronization value associated with said process with said global synchronization value;

if said local synchronization value equals said global synchronization value, incrementing both said local synchronization value and said global synchronization value prior to releasing said exclusive lock and performing one of releasing said exclusive lock and performing said PSE task and then performing the other one of said releasing said exclusive lock and performing said PSE task; and if said local synchronization value differs from said global synchronization value, setting said local synchronization value to be equal to said global synchronization value and releasing said exclusive lock.

2. The method of claim 1 wherein, said releasing said exclusive lock is performed prior to said performing said PSE task if said local synchronization value equals said global synchronization value.

3. The method of claim 1 wherein, said releasing said exclusive lock is performed after said performing said PSE task if said local synchronization value equals said global synchronization value.

4. The method of claim 1 wherein, a given process associated with a given local synchronization value is deemed inactive if a difference between said given local synchronization value and said global synchronization value exceeds a threshold value.

5. The method of claim 4 wherein, said threshold value is 1.

6. The method of claim 4 wherein, local synchronization values associated with said plurality of processes are stored in a second storage location, said second storage location being globally accessible to said plurality of processes.

7. The method of claim 6 wherein, said PSE task represents sending a notification pertaining to compliance state of said computer system.

8. The method of claim 6 wherein, said PSE task involves detecting inactive processes in said computer system based on said local synchronization values stored in said second storage location during said each rotation of said periodic schedule.

9. The method of claim 1 wherein, said computer system represents a partitionable computer system, said plurality of processes executing on at least two partitions of said partitionable computer system.

10. The method of claim 1 including making another attempt, using said process, during a given rotation of said periodic schedule to obtain said exclusive lock if said process fails to obtain said exclusive lock on a previous try, said previous try occurring during said given rotation of said periodic schedule.

11. In a computer system, a method for enabling a plurality of processes to manage the execution of a periodic single-execution (PSE) task, said PSE task representing a task to be performed once by one of said plurality of processes during each rotation of a periodic schedule, each of said plurality of processes being capable of performing said PSE task and scheduled to perform said PSE task during said each rotation of said periodic schedule, said method comprising:

providing a set of codes to said each of said plurality of processes, said set of codes being configured to execute on behalf of a given process of said plurality of processes at a periodically scheduled time in conformance with said periodic schedule, said set of codes including codes for allowing said given process to obtain an exclusive lock on a first storage location, said first storage location being globally accessible to said plurality of processes, said first storage location storing a global synchronization value, said exclusive lock allowing said given process to update said global synchronization value and preventing other processes from updating said global synchronization value if said exclusive lock is obtained by said given process;

codes for comparing said global synchronization value with a local synchronization value associated with said given process;

codes for performing steps (a)–(c) if said local synchronization value associated with said given process is equal to said global synchronization value, step (a) including incrementing both said local synchronization value associated with said given process and said global synchronization value prior to releasing said exclusive lock, step (b) including performing one of releasing said exclusive lock and performing said PSE task, and step (c) including performing the other one of said releasing said exclusive lock and said performing said PSE task; and codes for setting said local synchronization value associated with said given process to be equal to said global synchronization value and releasing said exclusive lock if said local synchronization value associated with said given process differs from said global synchronization value.

12. The method of claim 11 wherein, said step (b) is performed prior to said step (c).

13. The method of claim 11 wherein, said step (c) is performed prior to said step (b).

14. The method of claim 11 wherein, a first process associated with a first local synchronization value is deemed inactive if a difference between said first local synchronization value and said global synchronization value exceeds a threshold value.

15. The method of claim 14 wherein, said threshold value is 1.

16. The method of claim 14 wherein, local synchronization values associated with said plurality of processes are stored in a second storage location, said second storage location being globally accessible to said plurality of processes.

17. The method of claim 16 wherein said PSE task involves detecting inactive processes in said computer system based on said local synchronization values stored in said second storage location during said each rotation of said periodic schedule.

18. The method of claim 16 wherein, said PSE task represents sending a notification pertaining to compliance state of said computer system during said each rotation of said periodic schedule.

19. The method of claim 11 wherein, said PSE task represents updating a global temporary capacity value based on a number of components active in said computer system during said each rotation of said periodic schedule.

20. The method of claim 11 wherein, said computer system represents a partitionable computer system, said plurality of processes executing on at least two partitions of said partitionable computer system.

21. The method of claim 11 including making another attempt, using said process, during a given rotation of said periodic schedule to obtain said exclusive lock if said given process fails to obtain said exclusive lock on a previous fly, said previous try occurring during said given rotation of said periodic schedule.

22. An article of manufacture comprising a program storage medium having computer readable codes embodied therein, said computer readable codes being configured for enabling a process to manage the execution of a periodic single-execution (PSE) task, said process representing one of a plurality of processes executing on said computer system, said PSE task representing a task to be performed once by one of said plurality of processes for each rotation of a periodic schedule, each of said plurality of processes being capable of performing said PSE task and scheduled to perform said PSE task during said each rotation of said periodic schedule, comprising:

computer readable codes for obtaining an exclusive lock on a first storage location, said first storage location being globally accessible to said plurality of processes, said first storage location storing a global synchronization value, said exclusive lock preventing other processes from writing to said first storage location if said exclusive lock is obtained by said process;

computer readable codes for comparing a local synchronization value associated with said process with said global synchronization value;

computer readable codes for incrementing, if said local synchronization value equals said global synchronization value, both said local synchronization value and said global synchronization value prior to releasing said exclusive lock and performing one of releasing said exclusive lock and performing said PSE task and then performing the other one of said releasing said exclusive lock and performing said PSE task; and computer readable codes for setting said local synchronization value to be equal to said global synchronization value and releasing said exclusive lock if said local synchronization value differs from said global synchronization value.

23. The article of manufacture of claim 22 wherein, said releasing said exclusive lock is performed prior to said performing said PSE task if said local synchronization value equals said global synchronization value.

24. The article of manufacture of claim 22 wherein, said releasing said exclusive lock is performed after said performing said PSE task if said local synchronization value equals said global synchronization value.

25. The article of manufacture of claim 22 wherein, a given process associated with a given local synchronization value is deemed inactive if a difference between said given local synchronization value and said global synchronization value exceeds a threshold value.

26. The article of manufacture of claim 25 wherein, said threshold value is 1.

27. The article of manufacture of claim 25 wherein, local synchronization values associated with said plurality of processes are stored in a second storage location, said second storage location being globally accessible to said plurality of processes.

28. The article of manufacture of claim 27 wherein, said PSE task involves reporting on inactive processes in said computer system based on said local synchronization values stored in said second storage location during said each rotation of said periodic schedule.

29. The article of manufacture of claim 27 wherein, said PSE task represents sending a notification pertaining to compliance state of said computer system.

30. The article of manufacture of claim 22 wherein, said PSE task represents updating a global temporary capacity value based on a number of components active in said computer system during said each rotation of said periodic schedule.

31. The article of manufacture of claim 22 wherein, said computer system represents a partitionable computer system, said plurality of processes executing on at least two partitions of said partitionable computer system.

32. The article of manufacture of claim 22 further including computer readable codes for making another attempt, using said process, during a given rotation of said periodic schedule to obtain said exclusive lock if said process fails to obtain said exclusive lock on a previous try, said previous try occurring during said given rotation of said periodic schedule.

33. In a computer system, a method for enabling a process to manage the execution of a periodic single-execution (PSE) task, comprising:

obtaining an exclusive right to modify a global synchronization value;

comparing a local synchronization value associated with said process with a global synchronization value, said global synchronization value being stored in a storage location accessible to other processes executing on said computer system;

if said local synchronization value equals said global synchronization value, incrementing both said local synchronization value and said global synchronization value and performing said PSE task;

if said local synchronization value differs from said global synchronization value, setting said local synchronization value to be equal to said global synchronization value without performing said PSE task; and releasing said exclusive right.

34. The method of claim 33 wherein, said performing said PSE task is initiated prior to said releasing said exclusive right.

35. The method of claim 33 wherein, PSE task represents updating a global temporary capacity value based on a number of active components in said computer system.

36. The method of claim 33 wherein, said computer system represents a partitionable computer system.

* * * * *

UNITED STATES PATENT AND TRADEMARK OFFICE
CERTIFICATE OF CORRECTION

PATENT NO. : 7,228,545 B2
APPLICATION NO. : 10/351071
DATED : June 5, 2007
INVENTOR(S) : Edgar I. Circenis et al.

Page 1 of 1

It is certified that error appears in the above-identified patent and that said Letters Patent is hereby corrected as shown below:

In column 15, line 15, in Claim 17, delete "wherein" and insert -- wherein, --, therefor.

In column 15, line 35, in Claim 21, delete "fly" and insert -- try --, therefor.

Signed and Sealed this

Twelfth Day of August, 2008

JON W. DUDAS
*Director of the United States Patent and Trademark Office*